(No Model.)
M. MISHEL.
VEHICLE.
No. 569,343. Patented Oct. 13, 1896.
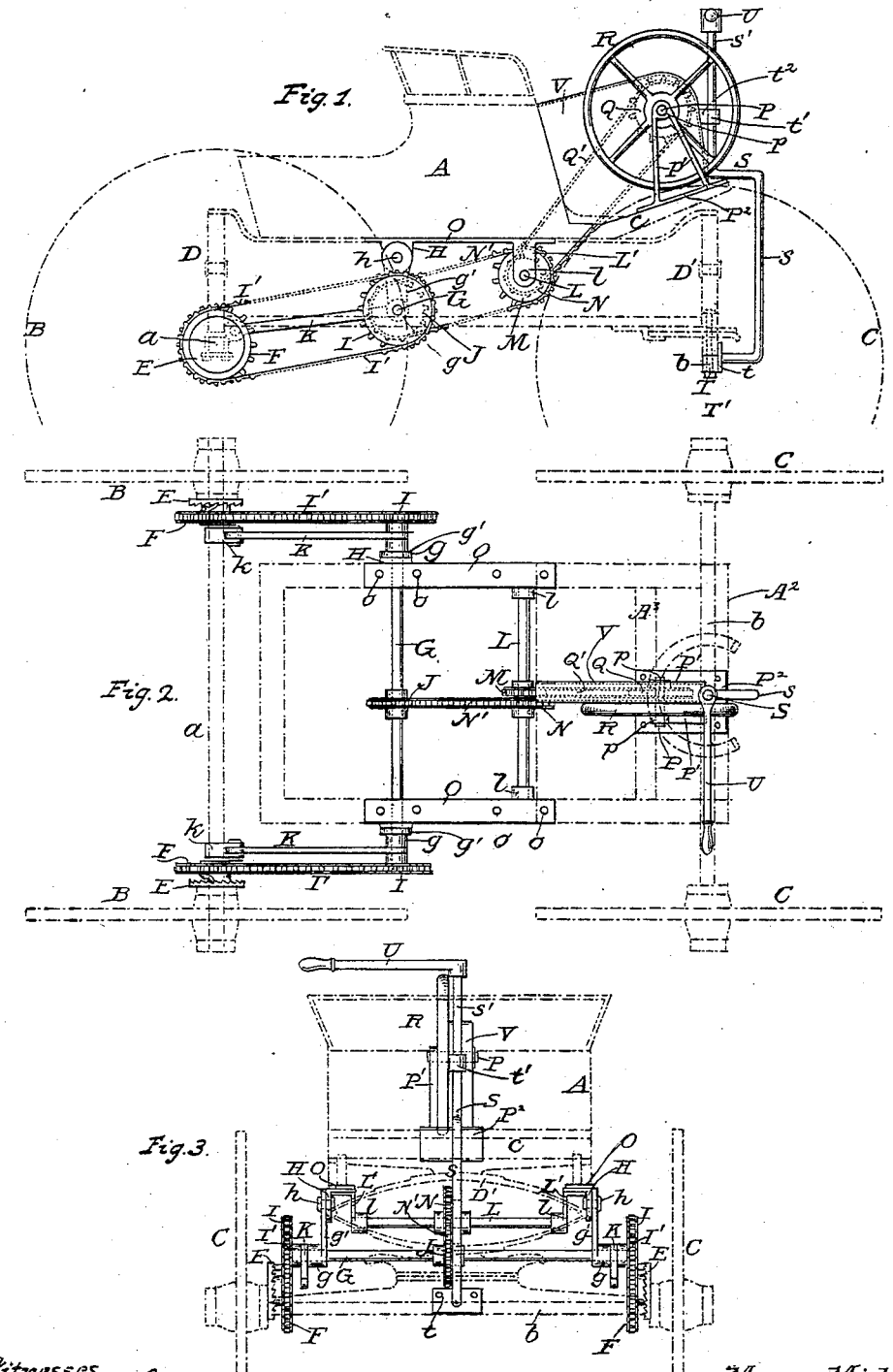
Witnesses.
Charles Selkirk
A. Selkirk Jr.
Moses Mishel,
Inventor
by Alex. Selkirk
Attorney.

UNITED STATES PATENT OFFICE.

MOSES MISHEL, OF GLOVERSVILLE, NEW YORK.

VEHICLE.

SPECIFICATION forming part of Letters Patent No. 569,343, dated October 13, 1896.

Application filed December 17, 1895. Serial No. 572,486. (No model.)

*To all whom it may concern:*

Be it known that I, MOSES MISHEL, a citizen of the United States, residing at Gloversville, in the county of Fulton and State of New York, have invented certain new and useful Improvements in Vehicles, of which the following is a specification.

My invention relates to improvements in that class of vehicles known as "horseless" vehicles; and it consists in the combinations of devices and elements hereinafter described, and specifically set forth in the claims.

The objects of my invention are to provide certain mechanisms and parts which may be readily applied to four-wheeled vehicles, as they may be constructed and are in use, for transmitting power from any preferred motor to the rear wheels of the vehicle for propelling the same, and for providing a convenient means for steering the same while being propelled. I attain these objects by the means illustrated in the accompanying drawings, forming a part of this specification, in which—

Figure 1 is an elevation of the mechanism employed and embodying the improvements in this invention, with the parts of a vehicle indicated by dotted lines. Fig. 2 is a plan view of the same, with the vehicle indicated by dotted lines; and Fig. 3 is a front view of a vehicle, indicated by dotted lines, and the parts thereof forming a part of this invention shown in full lines.

The same letters of reference refer to similar parts throughout the several views.

In the drawings, A is a body of a four-wheel vehicle, B B are the rear wheels, C C are the front wheels, D is the hind spring, D' the front spring, $a$ is the rear axle, $b$ is the front axle, and $c$ is the foot-board of the body A, all of which are indicated by dotted lines.

This vehicle may be of any preferred or suitable form of construction and calculated for carrying one or more persons.

E E are ratchet-wheels secured by any suitable means to the hubs of the rear wheels B B, and F F are sprocket-wheels loosely mounted on the spindles of the rear axle $a$, on which the wheels B revolve, and each said sprocket-wheel is provided with a pawl $e$ for engagement with the teeth of its coacting ratchet-wheel E.

G is a revolving shaft mounted in suitable bearings $g$, preferably provided with brackets $g'$, pivoted with a bracket H by pivot $h$.

I I are driving sprocket-wheels secured to the outer ends of shaft G, and I' I' are chain belts connecting sprocket-wheels E E and I I, so that the latter may drive the former. J is a driven sprocket-wheel also secured on shaft G and calculated to revolve with it.

K K are connection-rods pivoted each by one end with the rear axle $a$, preferably by a jointed coupling $k$, and by its opposite end with the shaft G, whereby the said shaft may be held at about one given distance from the said axle whatever the depression of the springs D may be.

L is a shaft suitably supported from bearings $l$, connected with brackets L'.

M is a driven sprocket-wheel, and N is a driving sprocket-wheel, both being mounted on said shaft L, so as to revolve with it. N' is a chain belt connecting the sprocket-wheels J and N, so that the latter may drive the former.

O O are coupling-plates, each a duplicate of the other as to their respective connections with brackets H and L', connected or secured to said plates. These coupling-plates are preferably of a width corresponding with that of the sills of the body A, with which they are to be secured preferably by bolts passing through the sills and perforations $o$ $o$, provided in said plates. The said brackets H and L' are the same distance apart from centers in each of said plates as those of the others, and the centers of the bearings of the respective shafts G and L are relatively at like distances, respectively, from the upper sides of the said plates, so that when these plates are secured to their proper places against the lower sides of the sills A' of the body the axis of the shafts G and L will be parallel.

P is the main drive-shaft, calculated to be revolved by a motor of any preferred class or kind, having with it any suitable crank or driving-gear or sprocket or other wheel (none of which are shown) necessary for connection with the motor preferred to be employed for revolving said shaft. This shaft P is supported in bearings $p$ $p$, connected or secured to suitable standards or brackets P', calculated to be secured to the foot-board c of the body of the vehicle and firmly hold said shaft in place and adapted for its proper connection with the motor (not shown) for revolving it. The foot ends of the said brackets are secured to the common base-plate P², which is suitably perforated for receiving bolts securing it to the frame-timbers of the body, which frame-timbers are indicated by dotted lines in the drawings, as at A² A³.

Q is a sprocket-wheel secured to shaft P, to be revolved by the motor, (not shown,) and Q' is a chain belt connecting said sprocket-wheel Q to sprocket-wheel M on shaft L for revolving the latter. R is a hand-wheel in the form of a fly-wheel, also mounted on said shaft P, so as to revolve with it. This hand-wheel is preferably of metal and is calculated to be used at will by an operator from his seat for changing the direction of revolution of shaft P when required for backing the vehicle or for aiding the motor in starting the revolution of the shaft, as may be required.

S is the steering-shaft, made with a crank-form portion s, offsetting outwardly from the line of the axis of the king-bolt T of the front axle b of the vehicle, and having its upwardly-projected portion s' on a line coincident with the axial line of said king-bolt T, as indicated by dotted line T' in Fig. 1. The lower end of this steering-shaft S is provided with a connecting-plate t, and is secured by it to the front axle b by suitable bolts or rivets, and its upper portion s' is suitably supported by sleeves or bearings t' t', supported by suitable brackets t² t² from the foot-board c of the body of the vehicle in any preferred manner.

U is a steering-handle secured to the upper end of the steering-shaft for turning it in either direction as may be required for guiding the vehicle when in motion.

V is casing for inclosing the sprocket-wheel Q and chain belt Q' between the seat and foot-board of the vehicle. This casing by its side walls also serves to stiffen the brackets supporting the bearings of the driving-shaft P and also may serve as a support for the lowermost bearing or sleeve t, supporting the upper portion s' of the steering-shaft S.

By my above-described improvements there may be provided suitable mechanisms and parts ready to be applied to vehicles already constructed for use by being drawn by animals without requiring any material alterations or changes in the same for transmitting motion to the rear wheels of the same from a suitable motor of any preferred class operated by gas, oil, air, electricity, or other agent, which motor may be placed within the body of the vehicle and beneath the seat and be suitably connected with the drive-shaft P for revolving the same.

By my above-described improvements labor and skill for proper alinement of the several shafts and parts are obviated, as all those parts are provided with means by which they may be secured in proper alinement and place with the parts of the vehicle, and the rear wheels be made to serve as traction-wheels capable of being equally or unequally revolved as may be required when running on straight or curved roads, and the driver be provided with a simple means for guiding the vehicle.

Having described my invention, what I claim, and desire to secure by Letters Patent, is—

1. In mechanism for transmitting motion to the rear wheels of a vehicle, the combination with ratchet-wheels calculated to be secured to the respective inner ends of the hubs of said wheels, sprocket-wheels provided each with a pawl for coaction with its neighboring ratchet-wheel and calculated to be loosely mounted on the spindles of the axle of said wheels, bearings provided with brackets and calculated to have each a pivoted connection with the side sills of the body of a vehicle, and a drive-shaft supported by its outer end portions in the said bearings, of connection-arms jointed each with an outer end portion of said drive-shaft and having their opposite ends provided with means for jointed connection with the rear axle of a vehicle, sprocket-wheels secured on each end of the drive-shaft for alinement with the sprocket-wheels provided with the pawls, and a chain belt connecting said sprocket-wheels on the shaft with those coacting with the ratchet-wheels, substantially as and for the purposes set forth.

2. In mechanism for transmitting motion to the rear wheels of a vehicle, the combination with a pair of coupling-plates O O, a drive-shaft having its outer end portions mounted in bearings connected with brackets which are respectively pivoted with each said coupling-plate in the same manner, sprocket-wheels mounted on the outer ends of the said drive-shaft for transmitting motion to a chain belt for revolving sprocket-wheels calculated to revolve the rear wheels of the vehicle, and connecting-rods for a jointed connection between said shaft and the rear axle of the vehicle, of a second shaft having its end portions supported in bearings which are each rigidly secured to said coupling-plates, so that their centers may each be at uniform distances from the centers of the bearings of the drive-shaft, a driven sprocket-wheel mounted on the drive-shaft, a drive sprocket-wheel secured to the second shaft, and connected by a chain belt with the driven sprocket-wheel on the drive-shaft, a driven sprocket-wheel also secured to said second shaft and calculated to be driven by a suitable driving mechanism, substantially as and for the purposes set forth.

3. In mechanism for transmitting motion to the rear wheels of a vehicle, the combination with the main drive-shaft P, calculated to be revolved by a suitable motor and mounted in bearings p p secured to standards P' rigidly connected with a common base-plate calculated to be secured to the foot-board of the body of a vehicle, a hand-wheel R secured on said main drive-shaft, a sprocket-wheel Q also secured to said shaft, of shafts L and G, mounted in bearings connected with coupling-plates O O, sprocket-wheels M, N, J, I, F, endless chains Q', N', and I' pawls pivoted with the sprocket-wheels F and ratchet-wheels E connected with the inner ends of the hubs of the rear wheels of a vehicle for coaction with said pawls, substantially as and for the purposes set forth.

MOSES MISHEL.

Witnesses:
WILLIAM A. McDONALD,
FRANK BURTON.